(12) United States Patent
Kim et al.

(10) Patent No.: US 8,571,008 B2
(45) Date of Patent: Oct. 29, 2013

(54) TIME SYNCHRONIZATION METHOD IN WIRELESS SENSOR NETWORK

(75) Inventors: Kyeong Tae Kim, Daejeon (KR); Byung Tae Jang, Daejeon (KR); Jeong Dan Choi, Daejeon (KR); Do Hyun Kim, Daejeon (KR); Jae Jun Yoo, Daejeon (KR); Kyung Bok Sung, Daejeon (KR); Jung Sook Kim, Seoul (KR); Jae Han Lim, Daejeon (KR); Jeong Ah Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 372 days.

(21) Appl. No.: 12/743,310

(22) PCT Filed: Jun. 12, 2008

(86) PCT No.: PCT/KR2008/003295
§ 371 (c)(1),
(2), (4) Date: May 17, 2010

(87) PCT Pub. No.: WO2009/069869
PCT Pub. Date: Jun. 4, 2009

(65) Prior Publication Data
US 2010/0260167 A1    Oct. 14, 2010

(30) Foreign Application Priority Data
Nov. 29, 2007  (KR) .................. 10-2007-0122750

(51) Int. Cl.
*H04J 3/06*        (2006.01)
(52) U.S. Cl.
USPC .......................................................... 370/350
(58) Field of Classification Search
USPC ........................................ 370/350, 516, 304
See application file for complete search history.

(56) References Cited

U.S. PATENT DOCUMENTS

| 5,237,612 A * | 8/1993 | Raith ........................ 380/247 |
| 7,668,151 B2 | 2/2010 | Ryu et al. |
| 2007/0177574 A1 * | 8/2007 | Park et al. .................... 370/350 |

FOREIGN PATENT DOCUMENTS

| KR | 10-2007-0009390 | 1/2007 |
| KR | 10-0686241 | 2/2007 |
| KR | 10-2007-0025098 | 3/2007 |
| KR | 10-0695074 | 3/2007 |

(Continued)

OTHER PUBLICATIONS

Jeremy Elson et al., "Fine-Grained Network Time Synchronization using Reference Broadcasts," Proceedings of the $5^{th}$ Symposium on Operating Systems Design and Implementation, (OSDI 2002), Dec. 2002, pp. 1-17.

(Continued)

*Primary Examiner* — Mark Rinehart
*Assistant Examiner* — Mohammad Anwar
(74) *Attorney, Agent, or Firm* — Staas & Halsey LLP

(57) ABSTRACT

The present invention relates to a time synchronization method in a wireless sensor network. In the present invention, if an upper node requests a lower reference node to start time synchronization, the lower reference node broadcasts a first sync reference packet. The upper node receives the first sync reference packet and transmits the first sync reference packet reception time to the lower reference node. The lower reference node broadcasts the first sync reference packet reception time, such that the other nodes perform time synchronization on the basis of the first sync reference packet reception time. Meanwhile, the lower reference node estimates the first sync reference packet reception time of the upper node to calculate the reception estimation time, and transmits the reception estimation time to a determination node that is two hops anterior to the lower reference node. Therefore, the determination node compares the reception time received from the upper node and the reception estimation time received from the lower reference node and determines whether a capture attack on the upper node has occurred.

15 Claims, 6 Drawing Sheets

(56) References Cited

FOREIGN PATENT DOCUMENTS

KR 10-2007-0105731 10/2007
WO 2004/075445 A1 9/2004

OTHER PUBLICATIONS

Saurabh Ganeriwal et al., "Timing-sync Protocol for Sensor Networks," Proceedings for the 1st International Conference on Embedded Networked Sensor Systems, 2003, pp. 138-149.

Kyeong Tae Kim et al., "SAEP: Secure and Accurate and Energy-efficient Time Synchronization in Wireless Sensor Networks," IEEE The 8th International Symposium on Parallel and Distributed Computing (ISPDC 2009), Jul. 1, 2009, 4 pages.

International Search Report for PCT/KR2008/003295, mailed on Oct. 22, 2008.

\* cited by examiner

TIME SYNCHRONIZATION METHOD IN WIRELESS SENSOR NETWORK

CROSS REFERENCE TO RELATED APPLICATIONS

This application claims the benefit under 35 U.S.C. Section 371 of PCT International Application No. PCT/KR2008/003295, filed Jun. 12, 2008, which claimed priority to Korean Patent Application No. 10-2007-0122750, filed Nov. 29, 2007, the entire disclosures of which are herein incorporated by reference as a part of this application.

TECHNICAL FIELD

The present invention relates to a time synchronization method in a wireless sensor network.

The present invention was supported by the IT R&D program of MIC/IITA [2006-S-024-02, Development of Telematics Application Service Technology based on USN Infrastructure].

BACKGROUND ART

In a wireless sensor network, communication between nodes is generally performed using a broadcasting method.

In the related art, reference broadcast synchronization (RBS) has been suggested as a time synchronization method in which energy efficiency is improved on the basis of characteristics of a wireless sensor network and error elements occurring at the time of applying a time difference calculation method through a timestamp message exchange are considered. In the RBS, nodes receive reference signals that are broadcast on a wireless sensor network, and use arrival points of time of the reference signals at the time of time comparison with other nodes to perform time synchronization between receiving nodes. In the RBS, when the reference signals are broadcast, a time difference should be calculated and maintained with respect to all of receiving nodes that receive the reference signals, which results in increasing the amount of messages used when time information is exchanged between the nodes. That is, when broadcasting is generated m times with respect to N nodes, the number of messages used during a synchronization process becomes $O(mN^2)$. As a result, energy efficiency is lowered. In order to provide a time synchronization method in a multi-hop environment, a node that commonly receives a message between two reference nodes should convert time of one area to another area. As a result, when the number of hops increases, time synchronization precision decreases.

As another time synchronization method, a timing-sync protocol for sensor networks (TPSN) is used. According to the TPSN, the operation is made in two steps, that is, a level setting step and a time synchronization step, in such a manner that a transmitter corrects its time on the basis of time of a receiver. Specifically, in the first step, a level is allocated to each of nodes on the network to form a hierarchical topology, and in the second step, a low-level node performs time synchronization on a high-level node. Finally, all nodes are synchronized with an uppermost node, and time synchronization is performed over the network. The TPSN provides much better performance than that of the RBS in a multi-hop environment, but is disadvantageous in that it is not possible to use a linear regression method that is used in the RBS in order to correct clock skew. Further, the TPSN cannot efficiently adjust to a dynamic change in a topology, and is not good in terms of scalability and a fault-tolerant system.

As another time synchronization method, a flooding time synchronization protocol (FTSP) may be used. The FTSP is used to synchronize local clocks of all nodes on a network. In the FTSP, time information is transmitted through flooding and a receiver receives the transmitted time information. The receiver corrects time errors on the basis of previously analyzed error elements and a linear regression analysis. The FTSP has a merit in that it can dynamically cope with a topology change due to a defective node and communication interruption, through flooding of a periodical synchronization message. However, the error elements that have been analyzed in the FTSP become different whenever an applied system is changed. These features affect accuracy of synchronization, which makes it difficult to generally apply the FTSP.

Accordingly, it is required to develop a new time synchronization method that can reduce a synchronization error and cope with various topology changes. Further, a time synchronization method that can overcome collision due to network congestion and reduce the amount of time needed until all nodes are synchronized is required.

Meanwhile, the time synchronization methods according to the related art have a drawback in security. Particularly, according to the related art, a method of efficiently coping with a node capture attack has rarely been studied. Due to the node capture attack that is a local attack, all information of the captured node that is related to encoding and decoding keys, an authentication key, routing, and contents stored in a memory is exposed to an invader. It is almost impossible to prevent the node capture attack and it is difficult to detect the node capture attack.

If the node capture attack occurs at the time of performing time synchronization using the RBS, erroneous time information is transmitted from the captured node to a certain node. As a result, the certain node that has received the erroneous time information from the captured node may erroneously calculate clock skew and offset, and makes it difficult to perform time synchronization on an entire network due to transmission of erroneous clock conversion information.

If the node capture attack occurs at the time of performing time synchronization using the TPSN, a parent node responds to a time synchronization request transmitted from a child node at an erroneous transmission/reception time. As a result, it may become impossible to accurately perform time synchronization on all lower nodes that form a spanning tree. The case may also be generated in which the captured node informs false level information and behaves as a false parent node.

In the case in which the node capture attack occurs at the time of performing time synchronization using the FTSP, if the captured node behaves as a root node, packets that start having a sequence number higher than that of the root node are transmitted, which makes it difficult to perform time synchronization over an entire network.

Accordingly, in order to prevent a Byzantine failure due to the node capture attack, it is required to develop a time synchronization method that can determine the captured node and prevent the node capture attack.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a time synchronization method having advantages of preventing a node capture attack in a wireless sensor network.

Technical Solution

An exemplary embodiment of the present invention provides a time synchronization method in a wireless sensor network. The time synchronization method includes, when a time synchronization start request packet is received from an upper node, allowing a reference node to broadcast a first sync reference packet; allowing the upper node to transmit a response packet including a first reception time when the upper node receives the first sync reference packet to the reference node; allowing the reference node to broadcast a second sync reference packet including the first reception time; and allowing at least one node adjacent to the reference node to perform time synchronization on the basis of the first reception time.

Another exemplary embodiment of the present invention provides a time synchronization method in a wireless sensor network. The time synchronization method includes allowing a lower reference node to broadcast a first sync reference packet; allowing the lower reference node to broadcast a second sync reference packet including a first reception time corresponding to the reception time of the first sync reference packet by an upper node; allowing at least one node adjacent to the lower reference node to perform time synchronization on the basis of the second sync reference packet; allowing the lower reference node to estimate the reception time of the first sync reference packet by the upper node and calculate a first reception estimation time; and allowing a determination node that is a plurality of hops anterior to the upper node to compare the first reception time and the first reception estimation time and determine whether a capture attack on the upper node has occurred.

Advantageous Effects

According to the embodiments of the present invention, there is provided a method of determining a captured node on a wireless sensor network. Therefore, it is possible to provide a time synchronization method that can prevent a Byzantine failure due to a node capture attack.

A reference node broadcasts a sync reference packet two times and reduces the number of times when packets are exchanged between neighbor nodes. Therefore, it is possible to reduce overhead and conversion time. Time synchronization is performed in a single direction from an upper node to a lower node, and a convergence time becomes unnecessary. Therefore, it is possible to provide an accurate time synchronization protocol in a multi-hop environment without deteriorating performance.

A scalable characteristic is shown with respect to the number of newly added nodes, and a quick and accurate time synchronization protocol can be provided even in a multi-hop environment.

MODE FOR INVENTION

Figure 1:
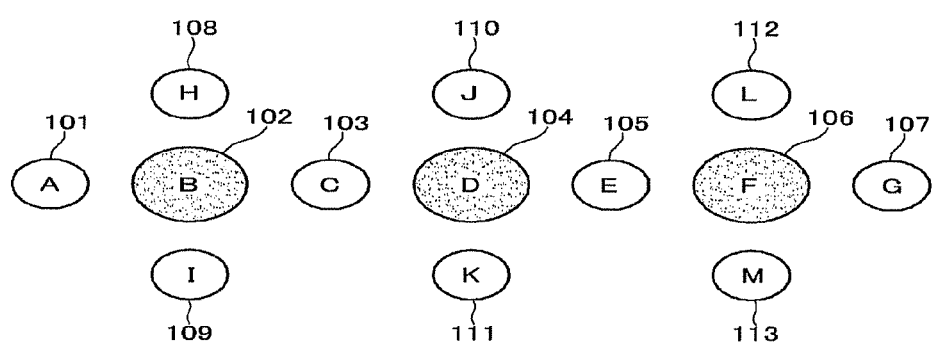
FIG. 1 is a configuration diagram illustrating an example of a wireless sensor network to which a time synchronization method according to an exemplary embodiment of the present invention is applied.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a time synchronization method in a wireless sensor network according to an exemplary embodiment of the present invention will be described in detail with reference to the accompanying drawings.

FIG. 1 is a schematic diagram illustrating an example of a wireless sensor network to which a time synchronization method according to an exemplary embodiment of the present invention is applied.

Referring to FIG. 1, a wireless sensor network includes an uppermost node (A node) 101, a plurality of reference nodes (B, D, and F nodes) 102, 104, and 106, and a plurality of lower nodes (C, E and G nodes) 103, 105, and 107.

In an exemplary embodiment of the present invention, times of all nodes on the wireless sensor network are synchronized in such a manner that lower nodes synchronize their times to the time of the uppermost node, and then further lower nodes synchronize their times.

For this purpose, the reference nodes 102, 104, and 106 on the wireless sensor network perform the following function. The reference nodes 102, 104, and 106 can broadcast sync reference packets and time information of upper nodes to neighbor nodes, such that the neighbor nodes can synchronize their times to the time of the uppermost node.

Next, a time synchronization method in a wireless sensor network according to an exemplary embodiment of the present invention will be described in detail with reference to FIGS. 2 to 4.

Figure 2:
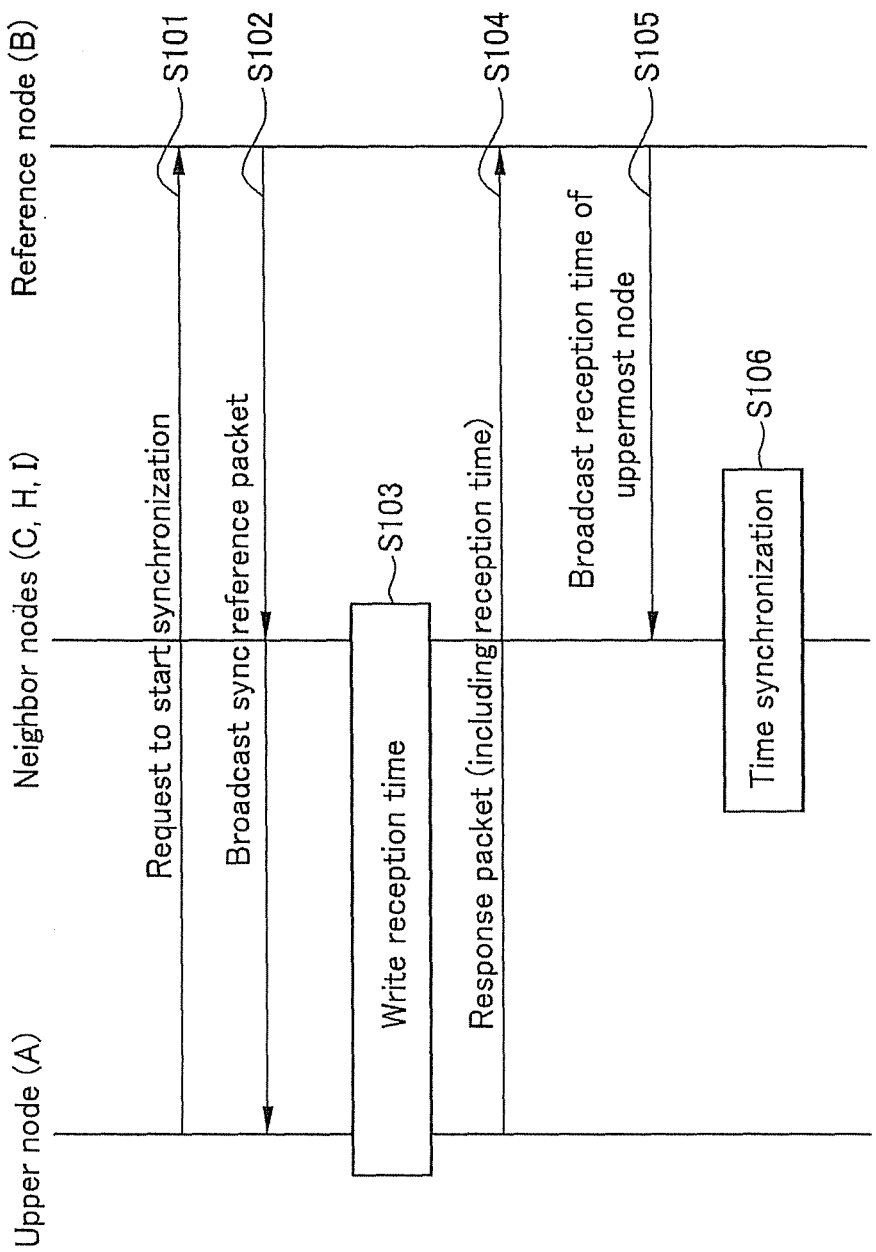
FIG. 2 is a flowchart illustrating a first time synchronization step that starts by an uppermost node in a wireless sensor network according to an exemplary embodiment of the present invention.

FIG. 2 is a flowchart illustrating a time synchronization method in a wireless sensor network according to an exemplary embodiment of the present invention, which shows a first time synchronization step that starts by the uppermost node.

Referring to FIG. 2, the time synchronization in the wireless sensor network starts from the A node 101 that is the uppermost node. That is, the A node 101 transmits a packet Req_Ref that requests to start time synchronization to the B node 102 as the reference node that is adjacent to the A node (S101).

Then, the B node 102 broadcasts the first sync reference packet Ref1 to all the neighbor nodes (A, C, H, and I nodes) 101, 103, 108, and 109 (S102). Meanwhile, whenever the B node 102 transmits a packet, the B node 102 uses an authentication algorithm, such as a one-way hash chain (OHC), for broadcasting authentication. That is, the B node 102 transmits the broadcast packets that include packets generated through the authentication algorithm. The nodes that receive the broadcast packets confirm the authentication packets and authenticate the transmission node. This is applicable to the other reference nodes 104 and 106 as well as the B node 102.

Meanwhile, if the neighbor nodes 101, 103, 108, and 109 that have received the sync reference packet Ref1 succeed in authenticating the first sync reference packet Ref1, each of them writes the reception time of the first sync reference packet received from the B node 102 (S103). Among the neighbor nodes, the A node 101 as the upper node transmits a response packet Res_Ref including its reception time $R_A^B$ to the B node 102 (S104).

Then, the B node 102 broadcasts a second sync reference packet Ref2 that includes the sync reference packet reception time $R_A^B$ of the A node 101 received from the A node 101 to the neighbor nodes (C, H, and I nodes) 103, 108, and 109 (S105). After receiving the second sync reference packet Ref2, each of the neighbor nodes (C, H, and I nodes) 103, 108, and 109 uses the reception time $R_A^B$ of the A node 101 to synchronize its time to the time of the A node 101 (S106).

The following Equation 1 represents, as an expression, a method in which each of the nodes synchronizes its time to the time of the A node 101.

$$\text{Offset} = R_A^B - RT \quad \text{(Equation 1)}$$

$$LT_{current} = LT_{prev} + \text{Offset}$$

In this case, RT indicates a value in which each node writes the reception time when receiving the first sync reference packet Ref1, $LT_{prev}$ indicates the local time (LT) before the corresponding node performs a synchronization process, and $LT_{current}$ indicates the local time after the corresponding node performs a synchronization process.

As described above, the A node 101 as the uppermost node requests to start time synchronization. In this case in which the reference node that broadcasts the sync reference packet is a node that is one hop posterior to the uppermost node, for example the B node 102, even if the reference node 102 is captured, the A node 101 can monitor (overhear) packet transmission of the B node 102. Therefore, a capture attack can be detected, and timestamp modulation is impossible.

Figure 3:
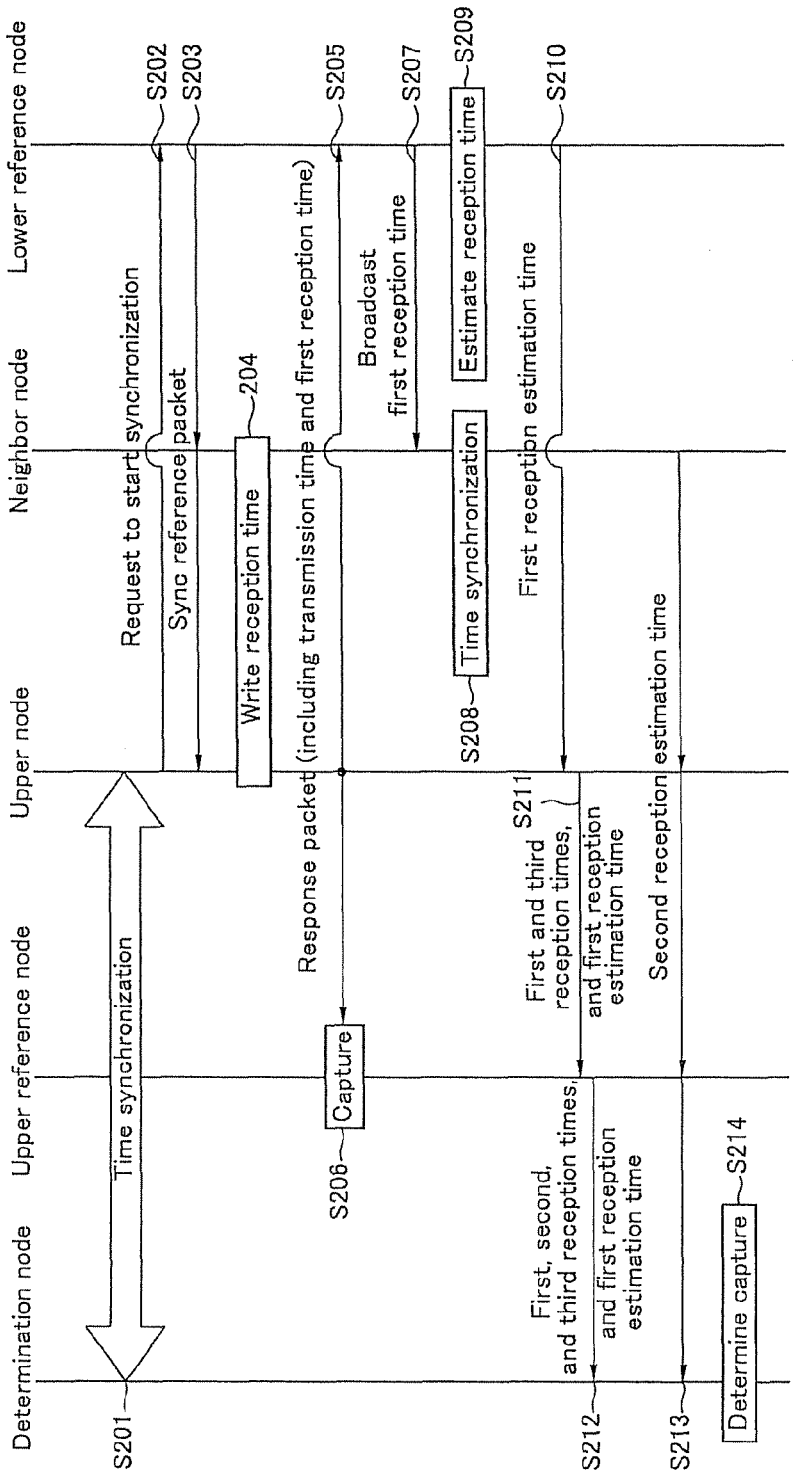
FIG. 3 is a flowchart illustrating a time synchronization method in a wireless sensor network according to an exemplary embodiment of the present invention.
Figure 5:
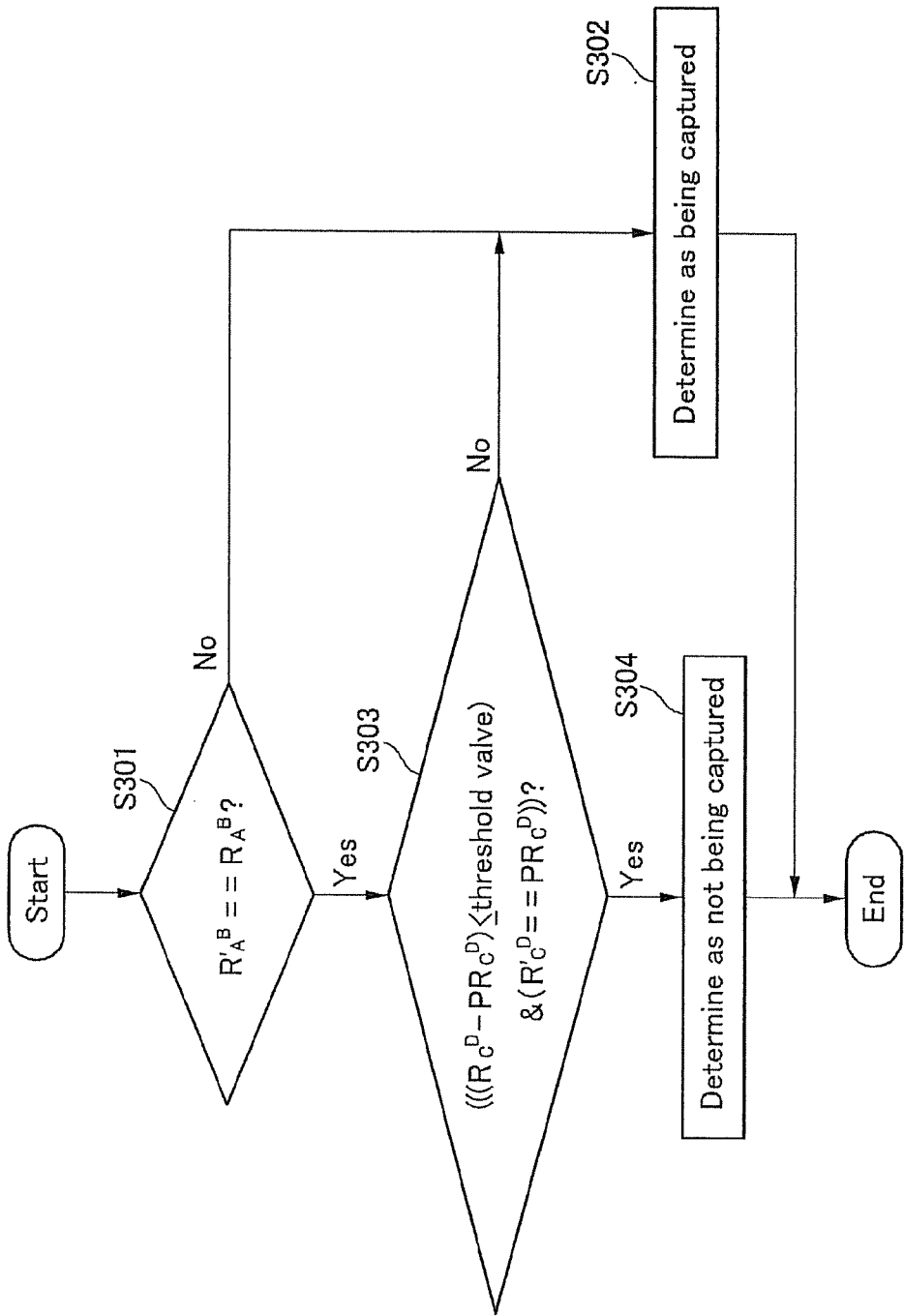
FIG. 5 is a flowchart illustrating a capture attack determination method according to an exemplary embodiment of the present invention.
Figure 6:
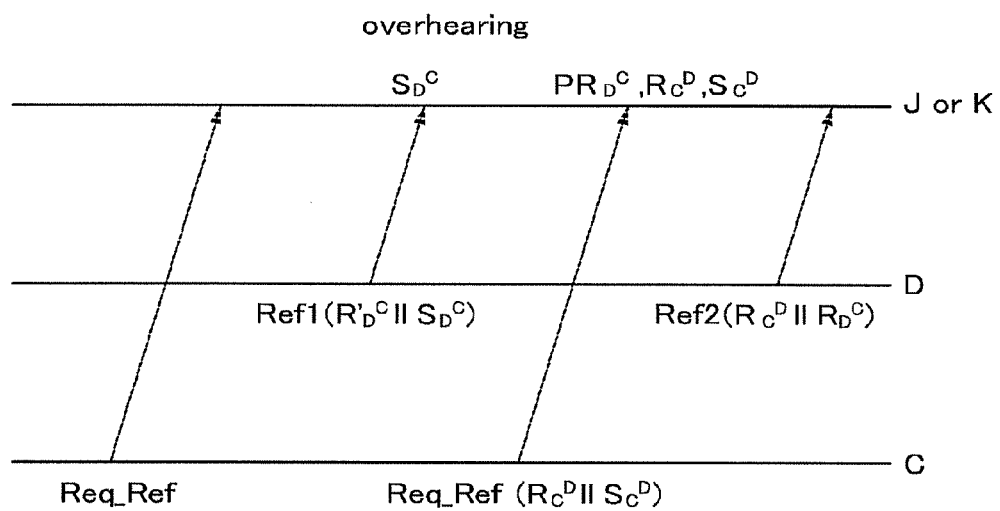
FIG. 6 is a diagram illustrating a method of acquiring parameters that are needed when neighbor nodes calculate the reception estimation time in accordance with an exemplary embodiment of the present invention.

FIG. 3 is a flowchart illustrating a time synchronization method in a wireless sensor network according to an exemplary embodiment of the present invention. Specifically, FIG. 3 is a flowchart illustrating steps of a time synchronization method that is performed after a first time synchronization step that starts from an uppermost node. FIG. 4 is a diagram illustrating an example of the reception time estimation method according to an exemplary embodiment of the present invention, and FIG. 5 is a flowchart illustrating a capture attack determination method according to an exemplary embodiment of the present invention. FIG. 6 is a diagram illustrating a method of acquiring parameters that are needed when neighbor nodes calculate the reception estimation time in accordance with an exemplary embodiment of the present invention.

Hereinafter, for better comprehension and ease of description, the C node 103 is exemplified as the upper node. The upper reference node as the reference node that is one hop anterior to the upper node becomes the B node 102, and a lower reference node as a low-level reference node becomes the D node 104. Neighbor nodes become the E node 105, the J node 110, and the K node 111 that are adjacent to the lower reference node. Finally, a determination node that determines a capture attack for the C node 103 or D node 104 becomes the A node 101 as a node that is two hops anterior to the upper node.

Referring to FIG. 3, first, the upper node whose time is synchronized to the time of the A node 101 as the node that is two hops anterior to the upper node (S201), that is, the C node 103, transmits a packet Req_Ref requesting to start time synchronization to the D node 104 as the lower reference node for time synchronization of the low-level nodes (S202). Therefore, the D node 104 broadcasts the sync reference packet Ref1 (S203), and writes the transmission time $S_D^C$ when the sync reference packet Ref1 is transmitted.

After receiving the sync reference packet, each of the nodes 103, 105, 110, and 111 writes the reception time when receiving the sync reference packet from the D node 104 (S204). Among them, the C node 103 that is the upper node transmits a response packet Res_Ref including its reception time to the D node 104 (S205). Here, the response packet Res_Ref may additionally include the transmission time $S_C^D$ when the C node 103 transmits the response packet Res_Ref to the D node 104.

At this time, the B node 102 that is the upper reference node of the C node 103 captures (overhears) the response packet Res_Ref of the C node 103 and acquires the reception time and the transmission time $S_C^D$ that are included in the response packet Res_Ref (S206). The B node 102 compares the acquired transmission time $S_C^D$ and time when the B node 102 captures the response packet Res_Ref. When the acquired transmission time $S_C^D$ and the time are not matched with each other, the B node 102 broadcasts an alarm message.

Hereinafter, for better comprehension and ease of description, the actual reception time when the C node 103 actually receives the sync reference packet is called the first reception time $R_C^D$, and the reception time when the B node 102 captures and acquires the response packet Res_Ref is called the second reception time $R'_C^D$.

Meanwhile, if the D node 104 as the lower reference node receives the response packet Res_Ref from the C node 103, the D node 104 writes the reception time $R_D^C$ when the D node receives the response packet Res_Ref, and broadcasts the second sync reference packet Ref2 that includes the first reception time $R_C^D$ acquired from the response packet Res_Ref (S207).

After receiving the second sync reference packet, each of the neighbor nodes (E, J, and K node) 105, 110, and 111 synchronizes its time to the time of the C node 103 using Equation 1 described above (S208). However, $R_A^B$ in Equation 1 is replaced by $R_C^D$.

Meanwhile, in order to determine whether there is a capture attack on the C node 103 as the upper node, the D node 104 uses the response packet Res_Ref received from the C node 103 to estimate the reception time when the C node 103 receives the sync reference packet Ref1 and calculate the reception estimation time $PR_C^D$ (S209). The following Equation 2 represents, as an expression, a method in which the D node 104 estimates the reception time when the C node receives the sync reference packet Ref1 and calculates the reception estimation time $PR_C^D$.

$$Delay=((R_C^D-S_D^C)+(R_D^C-S_C^D))/2 \quad \text{(Equation 2)}$$

$$Offset=((R_C^D-S_D^C)-(R_D^C-S_C^D))/2$$

$$PR_C^D=S_D^C+Offset+Delay$$

Figure 4:
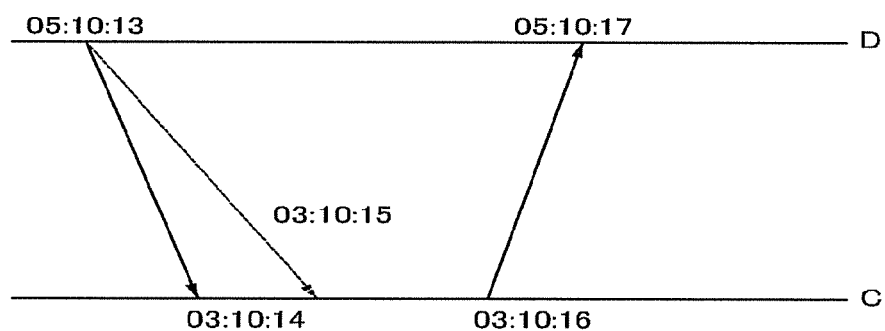
FIG. 4 is a diagram illustrating an example of the reception time estimation method according to an exemplary embodiment of the present invention.

FIG. 4 shows an example where the reception time is estimated using the reception estimation time calculation method.

Referring to FIG. 4, the actual reception time $R_C^D$ when the C node 103 actually receives the sync reference packet Ref1 is 03:10:14, and the transmission time $S_C^D$ when the response packet Res_Ref is transmitted is 03:10:16. The transmission time $S_D^C$ when the D node 104 transmits the sync reference packet Ref1 is 05:10:13, and the reception time $R_D^C$ when the D node 104 receives the response packet Res_Ref is 05:10:17. If the times are substituted in Equation 2, it can be represented by the following Equation 3.

$$Delay=[(03:10:14-05:10:13)+(05:10:17-03:10:16)]/2=00:00:01 \quad \text{(Equation 3)}$$

$$Offset=[(0:10:14-05:10:13)-(05:10:17-03:10:16)]/2=-02:00:00$$

$$PR_C^D=05:10:13-02:00:00+00:00:01=03:10:14$$

Meanwhile, in the case where the C node 103 is captured and the reception time $R_C^D$ of the modulated sync reference packet Ref1 is modulated as the time of 03:10:15 and then transmitted to the D node 104, the reception estimation time $PR_C^D$ that is calculated by the D node 104 can be represented by the following Equation 4.

$$Delay=[(03:10:15-05:10:13)+(05:10:16-03:10:15)]/2=00:00:01.5 \quad \text{(Equation 4)}$$

$$Offset=[(03:10:15-05:10:13)-(05:10:16-03:10:15)]/2=-02:00:00.5$$

$$PR_C^D=03:10:15-00:00:01.5+02:00:00.5=05:10:14$$

Accordingly, it can be known that the actual reception time (05:10:13) and the reception estimation time (05:10:14) are not matched with each other. The D node 104 compares the actual reception time $R_C^D$ and the reception estimation time $PR_C^D$ to confirm whether the C node 103 is captured or not. At this time, if the difference between the actual reception time $R_C^D$ and the reception estimation time $PR_C^D$ is equal to or larger than a threshold value, the D node 104 determines that the C node 103 is captured and the reception time $R_C^D$ is modulated, and broadcasts an alarm message. After broadcasting the alarm message, the D node 104 awaits an instruction message (confirmation) from the uppermost node during a predetermined period of time.

Referring back to FIG. 3, the D node 104 transmits a packet including the calculated reception estimation time $PR_C^D$ to the C node 103 as the upper node (S210). After receiving the packet, the C node 103 transmits a packet that includes the reception estimation time $PR_C^D$ received from the D node 104 and the first reception time $R_C^D$ as the actual reception time when the C node 103 actually receives the sync reference packet Ref1 to the B node 102. At this time, the C node 103 transmits the packet that includes the sync reference packet reception time of the A node 101 acquired from the second sync reference packet received from the upper reference node in the time synchronization step (S211). Hereinafter, for better comprehension and ease of description, the sync reference packet reception time $R'_A^B$ of the A node 101 that the C node 103 receives from the B node 102 as the upper reference node is called the third reception time, and the reception estimation time that is received from the D node 104 is called the first reception estimation time $PR_C^D$.

Then, the B node 102 transmits a packet that includes the first reception time $R_C^D$, the third reception time $R'_A^B$, and the first reception estimation time $PR_C^D$ received from the C node 103, and the second reception time $R'_C^D$ acquired by capturing the response packet Res_Ref of the C node 103 to the A node 101 as the determination node (S212).

The A node 101 that has received the packet determines whether a capture attack on the C node 103 has occurred, using the capture attack determination algorithm (S214).

FIG. 5 is a flowchart illustrating an example where the A node 101 determines a capture attack on the C node 103.

Referring to FIG. 5, the A node 101 compares the third reception time $R'_A^B$ that is included in the preferentially received packet and the actual reception time when the A node 101 actually receives the sync reference packet (S301). As a result of comparison, when the third reception time $R'_A^B$ and the actual reception time are not matched with each other, the A node 101 determines that the capture attack on the C node 103 has occurred (S302).

Meanwhile, when the third reception time $R'_A^B$ and the actual reception time are matched with each other, the A node 101 compares the first reception time $R_C^D$, the second reception time $R'_C^D$, and the first reception estimation time $PR_C^D$ (S303). When a difference between the first reception time $R_C^D$ and the first reception estimation time $PR_C^D$ is smaller than the threshold value and the first reception time $R_C^D$ and the second reception time $R_C^D$ are the same, the A node 101 determines that the capture attack on the C node 103 has not occurred (S304). When the difference between the first reception time $R_C^D$ and the first reception estimation time $PR_C^D$ is equal to or larger than the threshold value and the first reception time $R_C^D$ and the second reception time $R'_C^D$ are not the same, the A node 101 determines that the capture attack on the C node 103 has occurred (S302). In this case, the threshold value is differently selected according to time resolution that a system requires.

Meanwhile, in order to determine whether the capture attack on the D node 104 has occurred, in the exemplary embodiment of the present invention, the reception estimation time that is estimated by the nodes (J and K nodes) 110 and 111 adjacent to the D node 104 is used. Hereinafter, for better comprehension and ease of description, the reception estimation time that is calculated by the neighbor nodes (J and K nodes) 110 and 111 is called the second reception estimation time $PR'_C^D$.

FIG. 6 is a diagram illustrating a method of acquiring parameters that are needed when the neighbor nodes (J and K nodes) 110 and 111 calculate the second reception estimation time $PR'_C^D$.

Referring to FIG. 6, the D node 104 receives the time synchronization request packet Req_Ref from the C node 103, and transmits the sync reference packet Ref1 that includes the reception time $R'_D^C$ of the time synchronization request packet Req_Ref and the transmission time $S_D^C$ of the sync reference packet Ref1. After receiving the sync reference packet Ref1, the neighbor nodes (J and K nodes) 110 and 111 acquire the transmission time $S_D^C$ of the sync reference packet Ref1 from the D node 104, and calculate offset with the D node 104 on the basis of the reception time $R'_D^C$ using the same method as the method represented by Equation 1.

The neighbor nodes (J and K nodes) 110 and 111 capture (overhear) the response packet Res_Ref that is transmitted from the C node 103, and acquire the reception time $R_C^D$ of the sync reference packet Ref1 and the transmission time $S_C^D$ of the response packet Res_Ref of the C node 103. Using the reception times $R_J^C$, and $R_K^C$ when the neighbor nodes receive the response packet Res_Ref and the previously calculated offset with the D node 104, the neighbor nodes estimate the reception time $PR_D^C$ of the response packet Res_Ref by the D node 104.

As described above, using the reception time $R_C^D$ of the sync reference packet Ref1 and the transmission time $S_C^D$ of the response packet Res_Ref by the C node 103 acquired by capturing, and the transmission time $S_D^C$ of the sync reference packet Ref1 from the D node 104 and the reception estimation time $PR_D^C$ of the response packet Res_Ref by the D node 104, the neighbor nodes (J and K nodes) 110 and 111 calculate the second reception estimation time $PR'_C^D$ according to the same method as the method represented by Equation 2.

Referring back to FIG. 3, the neighbor nodes (J and K nodes) 110 and 111 transmits the second reception estimation time $PR'_C^D$ obtained as described above to the A node 101 (S213), and the A node 101 compares the second reception estimation time $PR'_C^D$ and the first reception estimation time $PR_C^D$ and determines whether a capture attack on the D node 104 has occurred (S214).

Meanwhile, the node capture attack may occur once with respect to one node, or continuously occur with respect to a plurality of nodes. Accordingly, at the time of performing capture determination, it is required to consider the case in which a plurality of nodes are continuously captured.

For example, when it is determined whether the B node 102 and the C node 103 are captured and the first reception time $R_C^D$ is modulated, the A node 101 receives the reception time of the sync reference packet Ref1 by the C node 103 that is acquired by capturing the response packet Res_Ref of the C node 103 from the H node 108 or the I node 109 and determines whether the corresponding nodes are captured.

When it is determined that the C node 103 and the D node 104 are captured and the first reception estimation time $PR_C^D$ is modulated, as described above, the A node 101 receives the second reception estimation time $PR'_C^D$ from the J node 110 or the K node 111 and determines whether the corresponding nodes are captured.

Further, when it is determined that the B node 102, the C node 103, and the D node 104 are captured and both the first reception time $R_C^D$ and the first reception estimation time $PR_C^D$ are modulated, the A node 101 receives the reception time of the sync reference packet Ref1 by the C node 103 that is acquired by capturing the response packet Res_Ref of the C node 103 from the H node 108 or I node 109, and the second reception estimation time $PR'_C^d$ calculated by the J node 110 or the K node 111. Then, the A node 101 determines whether the corresponding nodes are captured.

When it is determined that the B node 102 and the D node 104 are captured and the first reception estimation time $PR_C^D$ is modulated, as described above, the A node 101 receives the second reception estimation time $PR'_C^D$ from the J node 110 or the K node 111 and determines whether the corresponding nodes are captured. In this case, since the C node 103 is not captured, the A node 101 determines that the first reception time $R_C^D$ is valid.

According to the exemplary embodiment of the present invention, the case where the neighbor nodes (J and K nodes) 110 and 111 transmit the second reception estimation time $PR'_C^D$ to the A node 101 each time has been described, but the present invention is not limited thereto. Upon only a request from the A node 101, the calculated second reception estimation time $PR'_C^D$ may be transmitted to the A node 101.

Further, if the D node 104 broadcasts the reception time $R_C^D$ of the sync reference packet Ref1 by the C node 103 and the reception time $R_D^C$ of the response packet Res_Ref by the D node 104, the A node 101 may compare the reception time $R_D^C$ of the response packet Res_Ref by the D node 104 and the reception time $PR_D^C$ of the response packet Res_Ref by the D node 104 that is estimated by the neighbor nodes (J and K nodes) 110 and 111. Only when it is determined that they are not matched with each other may the calculated second reception estimation time $PR'_C^D$ be transmitted to the A node 101.

Meanwhile, in order to determine the capture attack, the packets that are transmitted to the A node 101, that is, the first, second, and third reception times, and the first and second reception estimation times, are encrypted with encryption keys of the nodes that transmit the packets and then transmitted. That is, the D node 104 encrypts the first reception estimation time $PR_C^D$ with its encryption key and transmits the encrypted first reception estimation time, and the C node 103 encrypts the first reception time $R_C^D$ and the third reception time $R_A^B$ with its encryption key and transmits the encrypted first and third reception times. Further, the B node 102 encrypts the second estimation time $R'_C^D$ with its encryption key and transmits the encrypted second estimation time, and the neighbor nodes (J and K nodes) 110 and 111 encrypt the second reception estimation time $PR'_C^D$ with their encryption keys and transmit the encrypted second reception estimation time.

This is to prevent the packets from being modulated due to a capture attack on intermediate nodes that transmit the packets to the determination node. Accordingly, if the A node 101 receives the packets used to determine the capture attack from the lower nodes, the A node 101 uses an encryption key corresponding to each packet to perform an authentication process, and uses the authenticated packets to determine whether the capture attack has occurred. For example, if receiving the first reception estimation time $PR_C^D$, the A node 101 uses an encryption key of the D node 104 to perform an authentication process. For this purpose, the A node 101 as the determination node and each lower node need to share an encryption key.

Meanwhile, in the above-described exemplary embodiment, the case has been described in which the C node 103 is the upper node and the D node 104 is the lower reference node. However, the above-described time synchronization method may be applied to the case in which the E node 105 is the upper node and the F node 106 is the lower reference node. In this case, the upper reference node becomes the D node 104 that is one hop anterior to the E node 105 as the upper node, and the determination node becomes the C node 103 that is two hops anterior to the E node 105 as the upper node.

The exemplary embodiments of the present invention that have been described above may be implemented by not only a method and an apparatus but also a program capable of realizing a function corresponding to the structure according to the exemplary embodiments of the present invention and a recording medium having the program recorded therein. It can be understood by those skilled in the art that the implementation can be easily made from the above-described exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A time synchronization method in a wireless sensor network, comprising:
when a time synchronization start request packet is received from an upper node, allowing a reference node to broadcast a first sync reference packet;
writing a first reception time at the upper node when the upper node receives the first sync reference packet from the reference node, wherein the first reception time is a time of receiving the first sync reference packet by the upper node;
allowing the upper node to transmit a response packet including the first reception time;
allowing the reference node to broadcast a second sync reference packet including the first reception time; and
allowing at least one node adjacent to the reference node to perform time synchronization on the basis of the first reception time.

2. The time synchronization method of claim 1, further comprising:
allowing the at least one node to write the reception time when the at least one node receives the first sync reference packet,
wherein the performing of time synchronization is performing time synchronization using a time difference between the reception time when the at least one node receives the first sync reference packet and the first reception time.

3. A time synchronization method in a wireless sensor network, comprising:
allowing a lower reference node to broadcast a first sync reference packet and writing a first reception time indicating a reception time of the first sync reference packet at an upper node wherein the first reception time is a time of receiving the first sync reference packet by the upper node;
allowing the lower reference node to broadcast a second sync reference packet including the first reception time;
allowing at least one node adjacent to the lower reference node to perform time synchronization on the basis of the second sync reference packet;
allowing the lower reference node to estimate a time of receiving the first sync reference packet by the upper node and calculate a first reception estimation time based on the estimated reception time; and
allowing a determination node that is a plurality of hops anterior to the upper node to compare the first reception time and the first reception estimation time and determine whether a capture attack on the upper node has occurred.

4. The time synchronization method of claim 3, wherein the performing of time synchronization is allowing the at least one node to synchronize its time to the time of the upper node using a time difference between the reception time when the at least one node receives the first sync reference packet and the first reception time.

5. The time synchronization method of claim 3, wherein the allowing of the determination node to determine whether a capture attack on the upper node has occurred includes allowing the determination node to determine that the capture attack on the upper node has occurred if a difference between the first reception time and the first reception estimation time is equal to or larger than a threshold value.

6. The time synchronization method of claim 3, further comprising:
allowing the upper node to transmit a response packet including a response packet transmission time to the lower reference node;
allowing an upper reference node that is one hop anterior to the upper node to capture the response packet; and
when the response packet captured time and the response packet transmission time are not matched with each other, allowing the upper reference node to broadcast an alarm message.

7. The time synchronization method of claim 3, further comprising:
allowing the upper node to transmit a response packet including the first reception time to the lower reference node; and
allowing an upper reference node that is one hop anterior to the upper node to capture the response packet and acquire a second reception time corresponding to the first reception time,
wherein the allowing of the determination node to determine whether the capture attack on the upper node has occurred includes allowing the determination node to determine that a capture attack on the upper node has occurred if the first reception time and the second reception time are not matched with each other.

8. The time synchronization method of claim 7, further comprising:
allowing the upper node to transmit a third reception time received from the upper reference node to the determination node in correspondence with the reception time of a sync reference packet by the determination node,
wherein the allowing of the determination node to determine whether the capture attack on the upper node has occurred further includes, when the third reception time is not matched with the actual reception time of the sync reference packet by the determination node, allowing the determination node to determine whether the capture attack on the upper node has occurred.

9. The time synchronization method of claim 8, wherein the first reception time, the second reception time, the third reception time, and the first reception estimation time are encrypted using encryption keys of corresponding transmission nodes and then transmitted to the determination node, and the allowing of the determination node to determine whether the capture attack on the upper node has occurred further includes allowing the determination node to authenticate the first reception time, the second reception time, the third reception time, and the first reception estimation time using the corresponding encryption keys.

10. The time synchronization method of claim 7, further comprising:
allowing the lower reference node to write its first sync reference packet transmission time; and
allowing the lower reference node to write its response packet reception time,
wherein the calculating of the first reception estimation time is calculating the first reception estimation time using the first reception time and the response packet transmission time acquired from the response packet and the first sync reference packet transmission time and the response packet reception time written by the lower reference node.

11. The time synchronization method of claim 10, wherein the calculating of the first reception estimation time includes:
using a difference between the first reception time and the first sync reference packet transmission time and a difference between the response packet reception time and the response packet transmission time to calculate a time difference and an amount of delay; and using the first reception time, the time difference, and the amount of delay to calculate the first reception estimation time.

12. The time synchronization method of claim 10, further comprising:

allowing the upper node to transmit a time synchronization start request packet to the lower reference node, wherein the first sync reference packet includes the first sync reference packet transmission time and the time synchronization start request packet reception time of the lower reference node.

13. The time synchronization method of claim 3, further comprising:

when a difference between the first reception time and the first reception estimation time is larger than a threshold value, allowing the lower reference node to broadcast an alarm message informing that the first reception time has been modulated; and allowing the lower reference node to await transmission of an instruction message from the determination node during a predetermined period of time after the alarm message is broadcast.

14. The time synchronization method of claim 3, further comprising:

allowing the at least one node to estimate the reception time of the first sync reference packet by the upper node and calculate a second reception estimation time; and allowing the determination node to compare the first reception estimation time and the second reception estimation time and determine whether the capture attack on the lower reference node has occurred.

15. A time synchronization method in a wireless sensor network, comprising:

allowing a lower reference node to broadcast a first sync reference packet;

allowing the lower reference node to broadcast a second sync reference packet including a first reception time corresponding to the reception time of the first sync reference packet by an upper node;

allowing at least one node adjacent to the lower reference node to perform time synchronization on the basis of the second sync reference packet;

allowing the lower reference node to estimate the reception time of the first sync reference packet by the upper node and calculate a first reception estimation time; and allowing a determination node that is a plurality of hops anterior to the upper node to compare the first reception time and the first reception estimation time and determine whether a capture attack on the upper node has occurred, further comprising:

allowing the at least one node to estimate the reception time of the first sync reference packet by the upper node and calculate a second reception estimation time; and allowing the determination node to compare the first reception estimation time and the second reception estimation time and determine whether the capture attack on the lower reference node has occurred, wherein the calculating of the second reception estimation time includes:

allowing the at least one node to calculate a time difference between the time synchronization start request packet reception time of the at least one node and the time synchronization start request packet reception time of the lower reference node;

allowing the at least one node to estimate the response packet reception time of the lower reference node using the response packet reception time of the at least one node and the time difference; and allowing the at least one node to calculate the second reception estimation time using the first reception time and the response packet transmission time acquired from the response packet, the first sync reference packet transmission time acquired from the first sync reference packet, and the estimated response packet reception time of the lower reference node.

* * * * *